(12) United States Patent
Kobayashi et al.

(10) Patent No.: US 8,708,715 B2
(45) Date of Patent: Apr. 29, 2014

(54) CIRCUIT STRUCTURE AND ELECTRIC JUNCTION BOX

(75) Inventors: Takehito Kobayashi, Yokkaichi (JP); Shinsuke Okumi, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 15 days.

(21) Appl. No.: 13/511,577

(22) PCT Filed: Nov. 26, 2010

(86) PCT No.: PCT/JP2010/071089
§ 371 (c)(1),
(2), (4) Date: May 23, 2012

(87) PCT Pub. No.: WO2011/065461
PCT Pub. Date: Jun. 3, 2011

(65) Prior Publication Data
US 2012/0252234 A1    Oct. 4, 2012

(30) Foreign Application Priority Data

Nov. 26, 2009 (JP) ................... 2009-269060

(51) Int. Cl.
*H01R 12/00* (2006.01)
(52) U.S. Cl.
USPC .......................... 439/76.2; 439/949
(58) Field of Classification Search
USPC .......................... 439/76.2, 404, 949
See application file for complete search history.

(56) References Cited

U.S. PATENT DOCUMENTS

| | | | | |
|---|---|---|---|---|
| 6,229,320 B1* | 5/2001 | Haseyama et al. | ........ | 324/750.25 |
| 6,238,221 B1* | 5/2001 | Ikeda et al. | ................. | 439/76.2 |
| 6,270,359 B1* | 8/2001 | Kondo et al. | ................. | 439/76.2 |
| 6,409,522 B1* | 6/2002 | Onizuka | ......................... | 439/74 |
| 6,520,780 B2* | 2/2003 | Chemin | ......................... | 439/76.2 |
| 6,851,956 B2* | 2/2005 | Saka et al. | ................... | 439/76.2 |
| 6,890,209 B2* | 5/2005 | Sawada et al. | ................ | 439/404 |

(Continued)

FOREIGN PATENT DOCUMENTS

| | | |
|---|---|---|
| JP | A-08-223741 | 8/1996 |
| JP | A-2000-092659 | 3/2000 |

(Continued)

OTHER PUBLICATIONS

Written Opinion of the International Searching Authority issued in Application No. PCT/JP2010/071089; Dated Feb. 15, 2011 (With Translation).

(Continued)

*Primary Examiner* — James Harvey
(74) *Attorney, Agent, or Firm* — Oliff PLC

(57) ABSTRACT

A circuit structure includes a circuit board having a conduction path and a through-hole continuing to the conduction path, a wire routing member that has a wire holding convex portion holding a wire configured to form a pre-determined conduction path and that is disposed to face the circuit board, a relaying wire whose one end is inserted into the through-hole in the circuit board to thereby connect the conductor path on the wire routing plate to that on the circuit board, and a positioning portion that is provided on the wire routing plate to thereby position a tip of the relaying wire.

11 Claims, 22 Drawing Sheets

(56) References Cited

U.S. PATENT DOCUMENTS

| | | | |
|---|---|---|---|
| 7,172,436 B2 * | 2/2007 | Uezono | 439/76.2 |
| 7,217,998 B2 * | 5/2007 | Tamagawa et al. | 257/707 |
| 7,470,130 B2 * | 12/2008 | Kubota et al. | 439/76.1 |
| 2004/0058569 A1 * | 3/2004 | Uezono | 439/76.2 |
| 2006/0211300 A1 | 9/2006 | Kubota et al. | |
| 2012/0252234 A1 * | 10/2012 | Kobayashi et al. | 439/76.2 |
| 2012/0329309 A1 * | 12/2012 | Weaver et al. | 439/404 |

FOREIGN PATENT DOCUMENTS

| | | |
|---|---|---|
| JP | A-2002-369340 | 12/2002 |
| JP | A-2005-051878 | 2/2005 |
| JP | A-2005-253173 | 9/2005 |
| JP | A-2006-156355 | 6/2006 |
| JP | A-2008-305579 | 12/2008 |

OTHER PUBLICATIONS

International Search Report issued in Application No. PCT/JP2010/071089; Dated Feb. 15, 2011 (With Translation).

May 14, 2013 Office Action issued in Japanese Patent Application No. 2009-269060 (with translation).

* cited by examiner

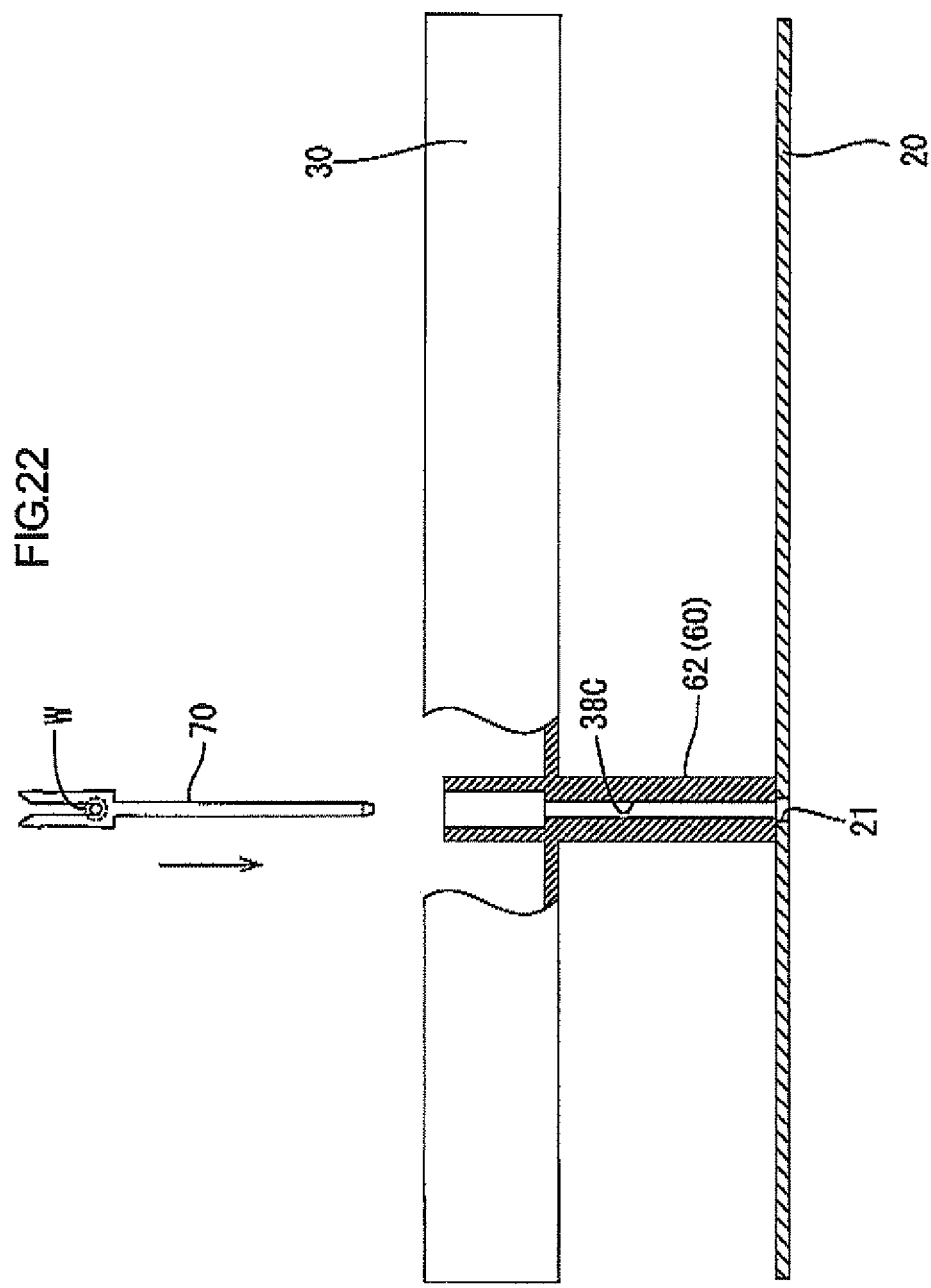

CIRCUIT STRUCTURE AND ELECTRIC JUNCTION BOX

TECHNICAL FIELD

The present invention relates to a circuit structure and an electric junction box.

BACKGROUND ART

A metal-made bus bar has been used as a conduction path in a circuit structure or an electric junction box which is mounted on a path that distributes power from a power source to a load. There has been a problem in that an increase in load current supplied to the load might increase the area of the bus bar, thereby, increasing the size of the circuit structure or the electric junction box.

It may be considered to reduce the area of the bus bar by increasing its thickness for miniaturization. However, it may increase production costs and carry a large current internally to increase heat generation, thereby leading to a problem in that radiation efficiency may be degraded.

To solve the problems, as described in Patent Document 1, a method is developed of using a wire routed to a wiring module in order to interconnect a terminal of a connector block in which a bus bar has been used conventionally and a terminal of power block. The method can dispose clad-insulated wires 3-dimensionally and is expected to miniaturize the device and improve workability.

Patent Document 1: Japanese Unexamined Patent Publication No. 2005-51878

In a structure described in Patent Document 1, the connector block is different in height from another connector block and, accordingly, a wire cannot directly be connected to the terminal of the connector block; therefore, a bus bar is used to connect the wire and the terminal to each other. The bus bar has its one end side connected to the connector block terminal etc. and the other end thereof bent upward in such a manner that a press-contact terminal at its tip is press-contacted to the wire for connection with it.

However, in the case of connection to the wire via the bus bar in such a manner, to change its height, the bus bar needs to be bent. It may restrict the shape and disposition of the bus bar and possibly be an obstacle to miniaturization of the circuit structure and the electric junction box.

Therefore, there is a need in the art to miniaturize a circuit structure and an electric junction box.

SUMMARY

The present invention is a circuit structure including a circuit board having a conduction path and a through-hole continuing to the conduction path, a wire routing member that has a wire holding portion holding a wire configured to form a predetermined conductor path and that is disposed to face the circuit board, a relay connection portion having its one end inserted through the through-hole in the circuit board to thereby connect the conduction path of the wire routing member to the conduction path on the circuit board, and a positioning portion that is provided on the wire routing member to thereby position a tip of the relay connection portion.

Another aspect of the present invention is an electric junction box including the circuit structure and a case housing the circuit structure.

According to the present invention, the conduction path of the wire routing member is connected to the conduction path on the circuit board by using the relay connection portion to thereby eliminate the need to use a bus bar bent for interconnection of the conduction paths, thereby enabling miniaturizing the circuit structure and the electric junction box.

In this case, when attaching a wire routing member to the circuit board, alignment accuracy may possibly be insufficient in a process to insert the tip end portion of the relay connection portion into the through-hole, thereby leading to poor insertion. However, the present structure a the positioning portion that positions the tip end of the relay connection portion and, therefore, can improve the alignment accuracy to successfully insert the tip end portion of the relay connection portion into the through-hole. Accordingly, it is possible to improve the workability in attaching the wire routing member to the circuit board.

According to the present invention, it is possible to miniaturize the circuit structure and the electric junction box.

BRIEF DESCRIPTION OF THE DRAWINGS

FIG. 22 is an illustrative view showing how the relay terminal in a state where the wire is press-contacted is inserted to the positioning portion according to a third embodiment.

EXPLANATION OF SYMBOLS

Figure 1:
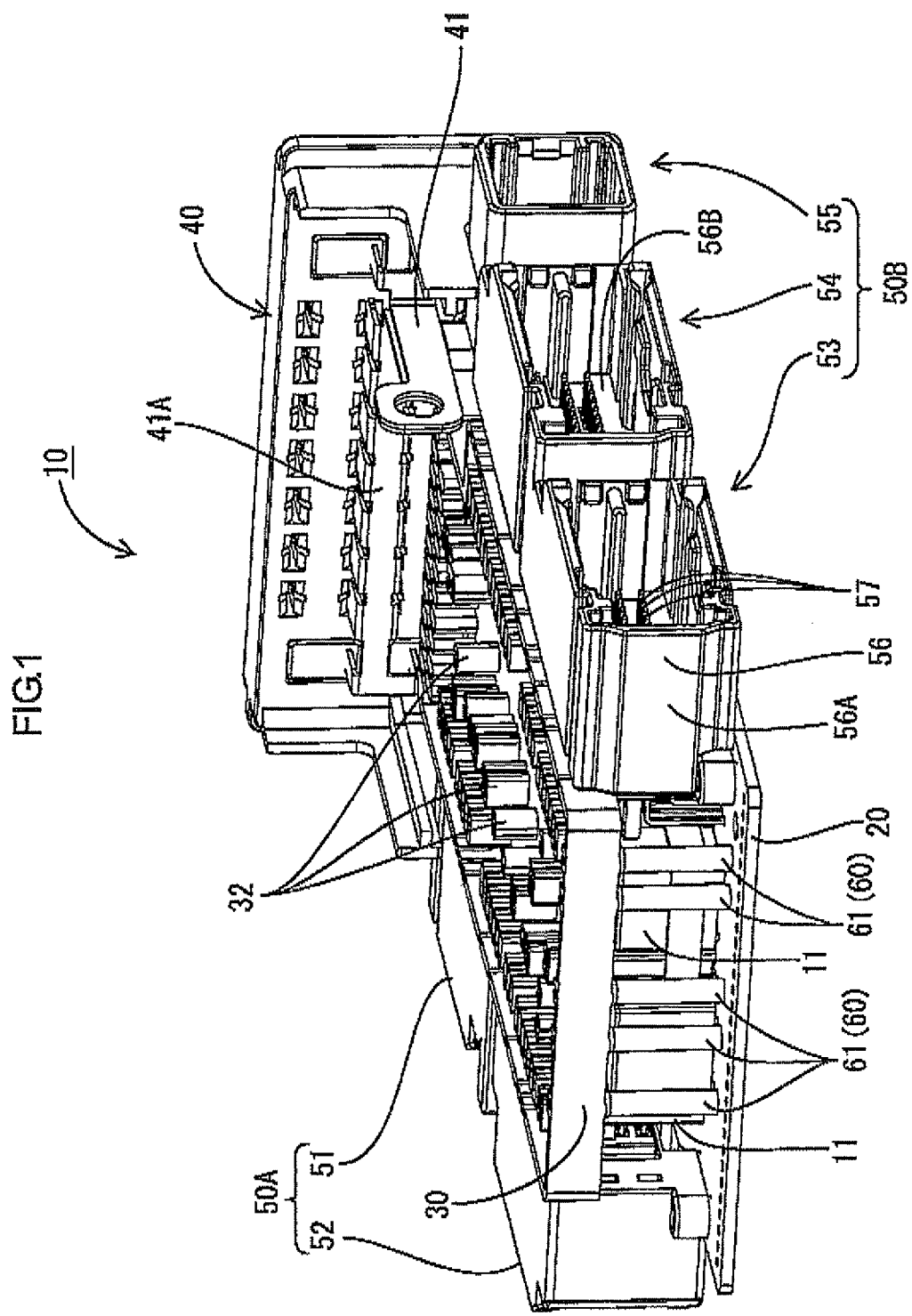
FIG. 1 is a perspective view showing a circuit structure of a first embodiment.

10: Circuit structure
20: Circuit board
21: Through-hole
30: Wire routing plate 32: Wire holding convex portion (wire holding portion)
33: Press-contacting holding portion
35: Insertion holding portion
36: Wire let-in portion
37, 38C: Insertion hole
38: Relay holding portion
57A, 70B: Press-contact blade
60, 80: Positioning portion
61: Wire positioning portion
62: Terminal positioning portion
70: Relay terminal (relay connection portion)
70A: Insertion terminal portion
81: Notched portion
82: Diameter-expanded portion
83: Outer surface notched portion
W: Wire
WR: Relay wire (relay connection portion)
H: Solder

BEST MODE FOR CARRYING OUT THE INVENTION

First Embodiment

The following will describe a first embodiment of the present invention with reference to FIGS. 1 to 18. A circuit structure 10 in the first embodiment is connected to a power supply such as a battery serving as an electric junction box (not shown) housed in a case (not shown) and a vehicle-mounted electric component such as a head lamp or a windshield wiper, to supply power to the various vehicle-mounted electric components and control the supply power. In the following description, the right and the left in FIG. 2 are referred to as "right" and "left" and the upper side and the lower side of FIG. 2 are referred to as "front side" and "rear side", respectively.

Figure 2:
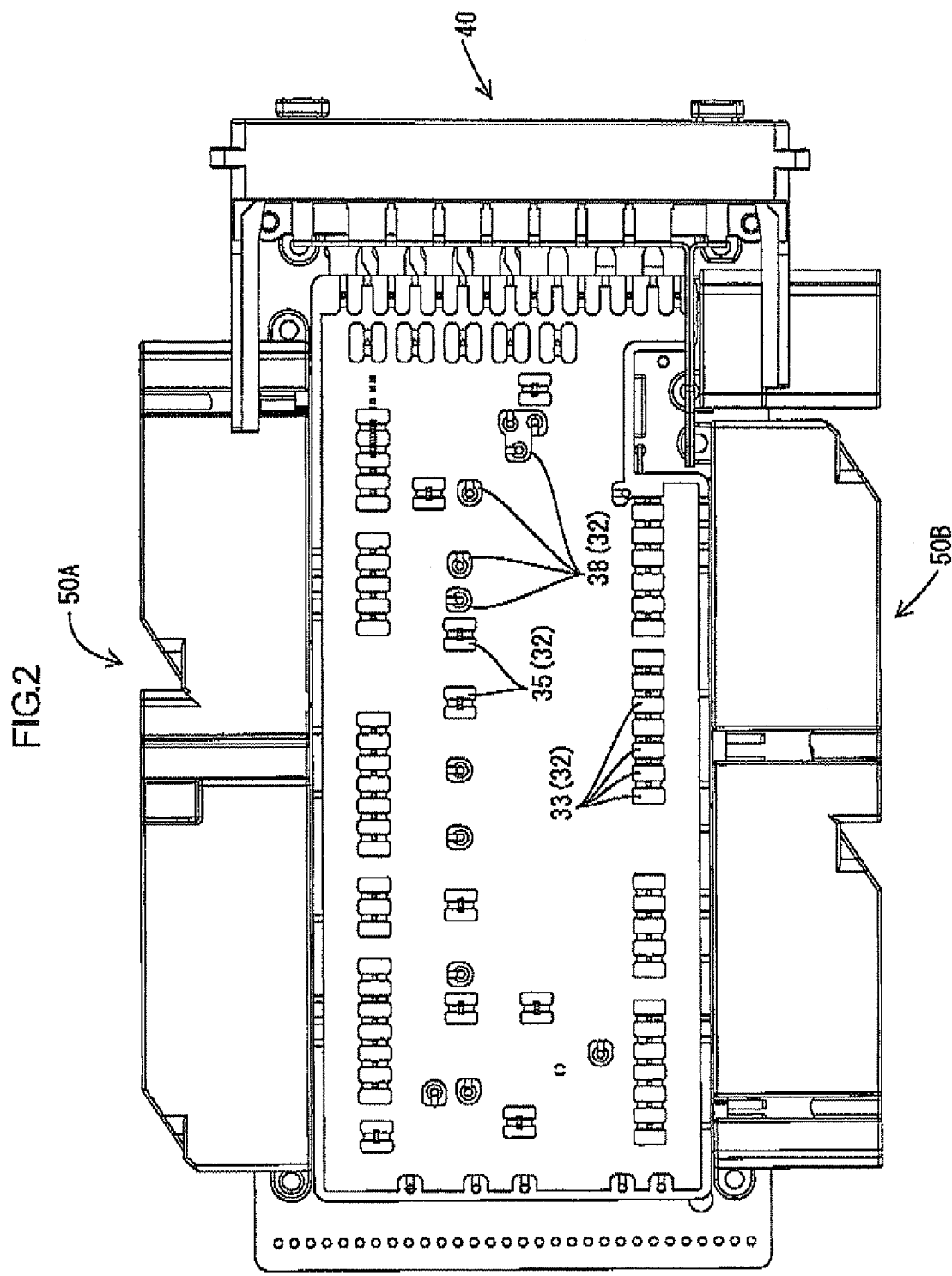
FIG. 2 is a top view showing the circuit structure.
Figure 3:
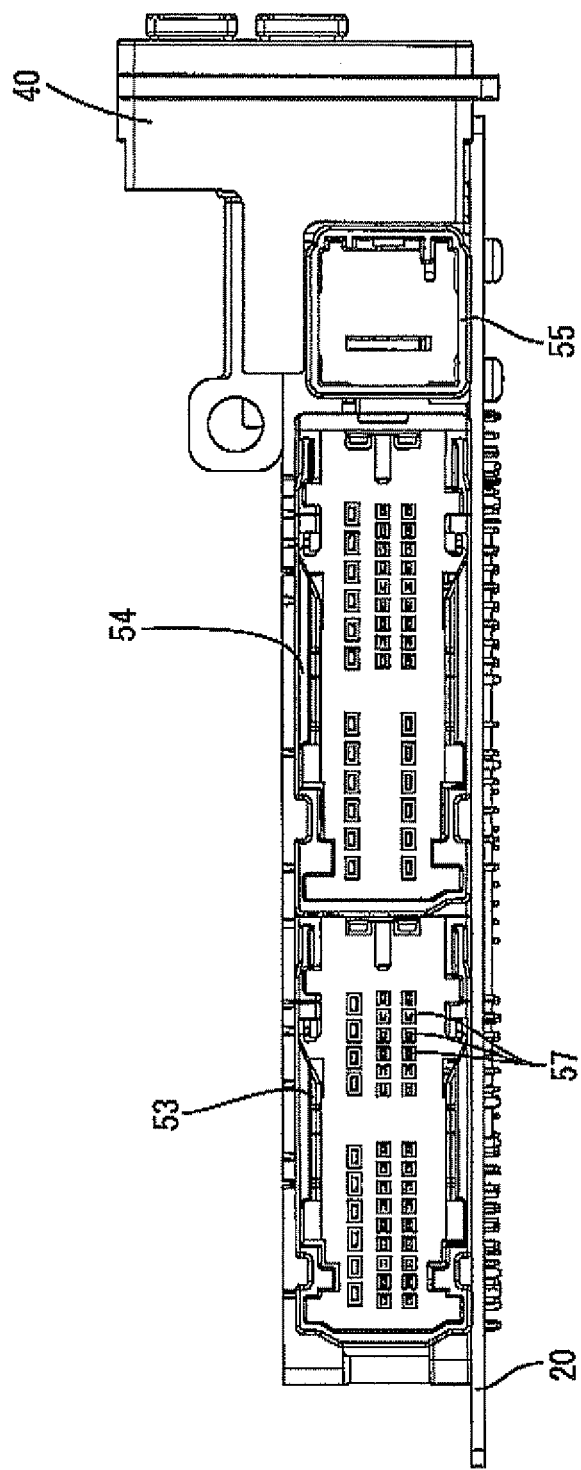
FIG. 3 is a rear view showing the circuit structure.
Figure 4:
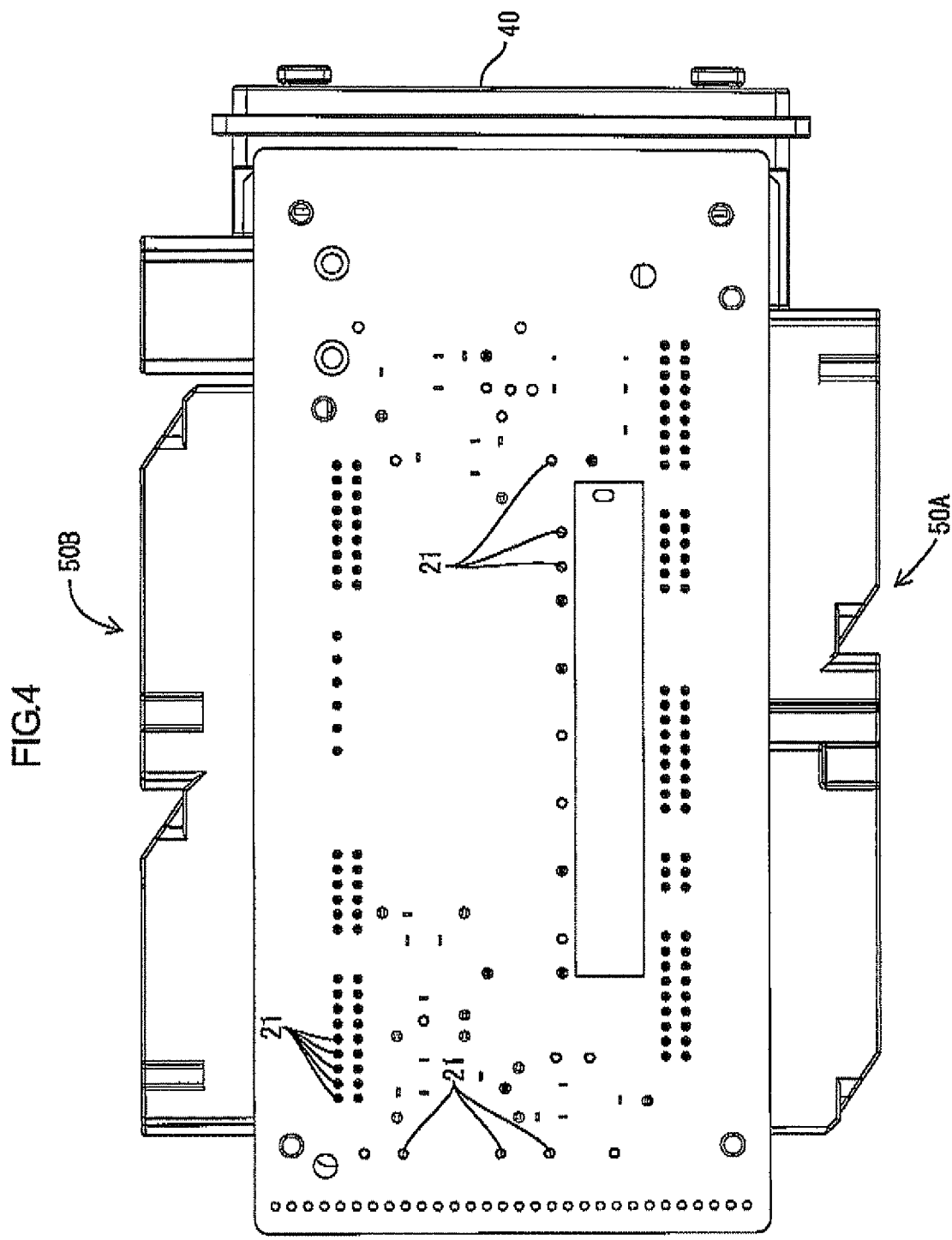
FIG. 4 is a bottom view showing the circuit structure.
Figure 5:
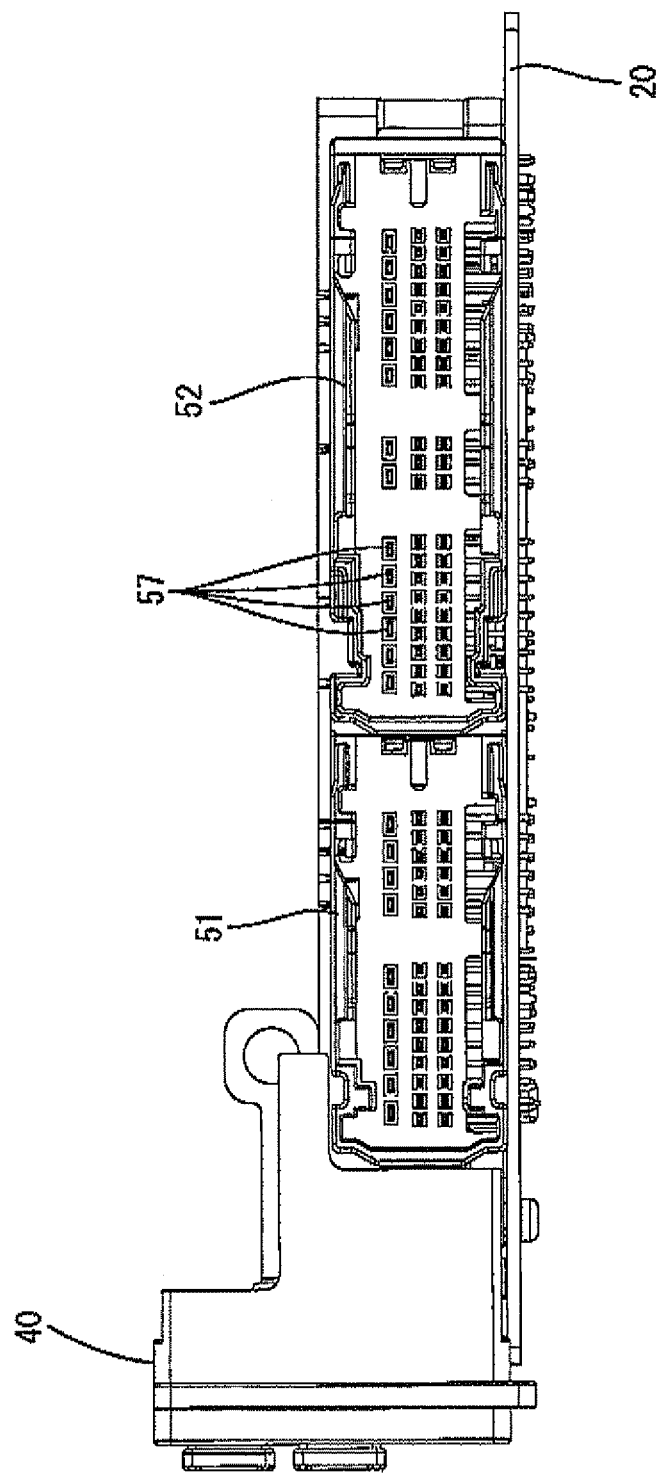
FIG. 5 is a front view showing the circuit structure.
Figure 6:
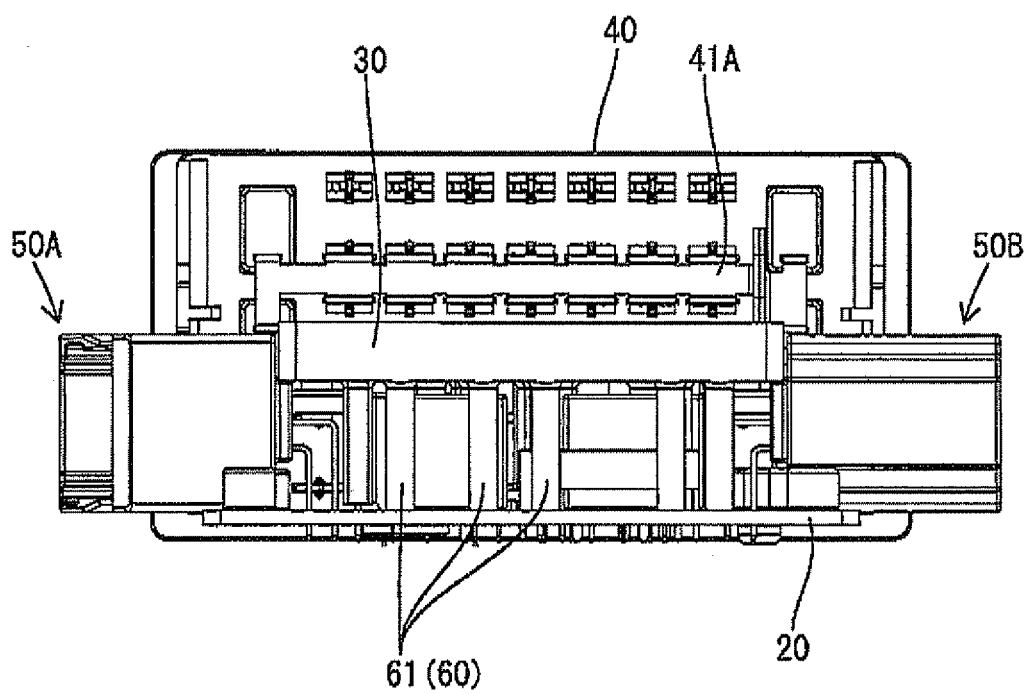
FIG. 6 is a side view showing the circuit structure.
Figure 7:
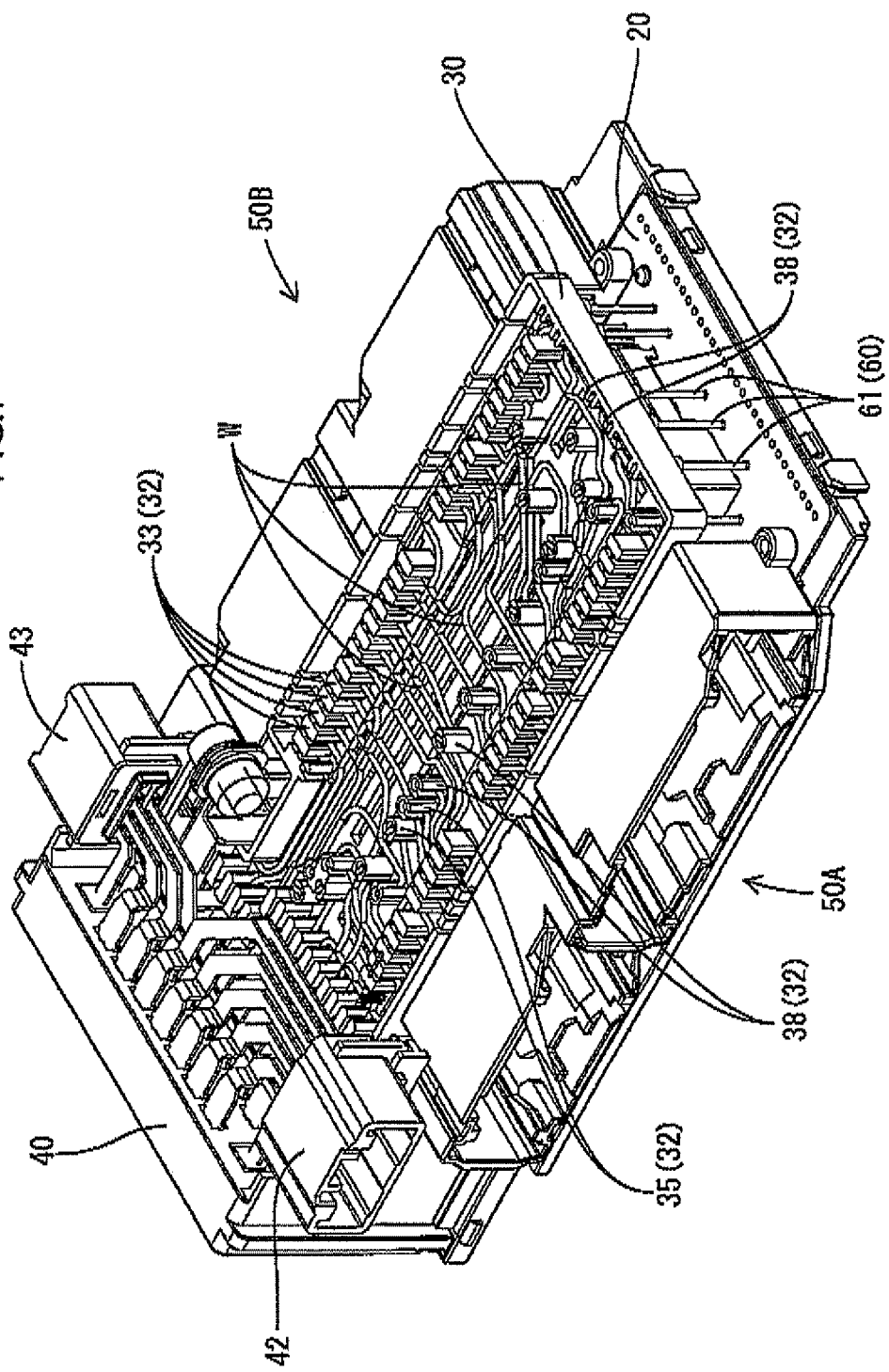
FIG. 7 is an illustrative view showing a state in which a wire is routed to the circuit structure.

As shown in FIG. 1, the circuit structure 10 has a circuit board 20 mounted with an electronic component 11, a wire routing plate 30 (one example of "wire routing member" described in Claims) which is disposed to face the circuit board 20 and over which a wire W is routed, a fuse block 40 provided at its right end portion, and connector blocks 50A and 50B provided at its front and rear end portions respectively. As the wire W, a cladded wire is used which is obtained by covering a single core wire with an insulation sheath (see FIG. 7).

Figure 8:
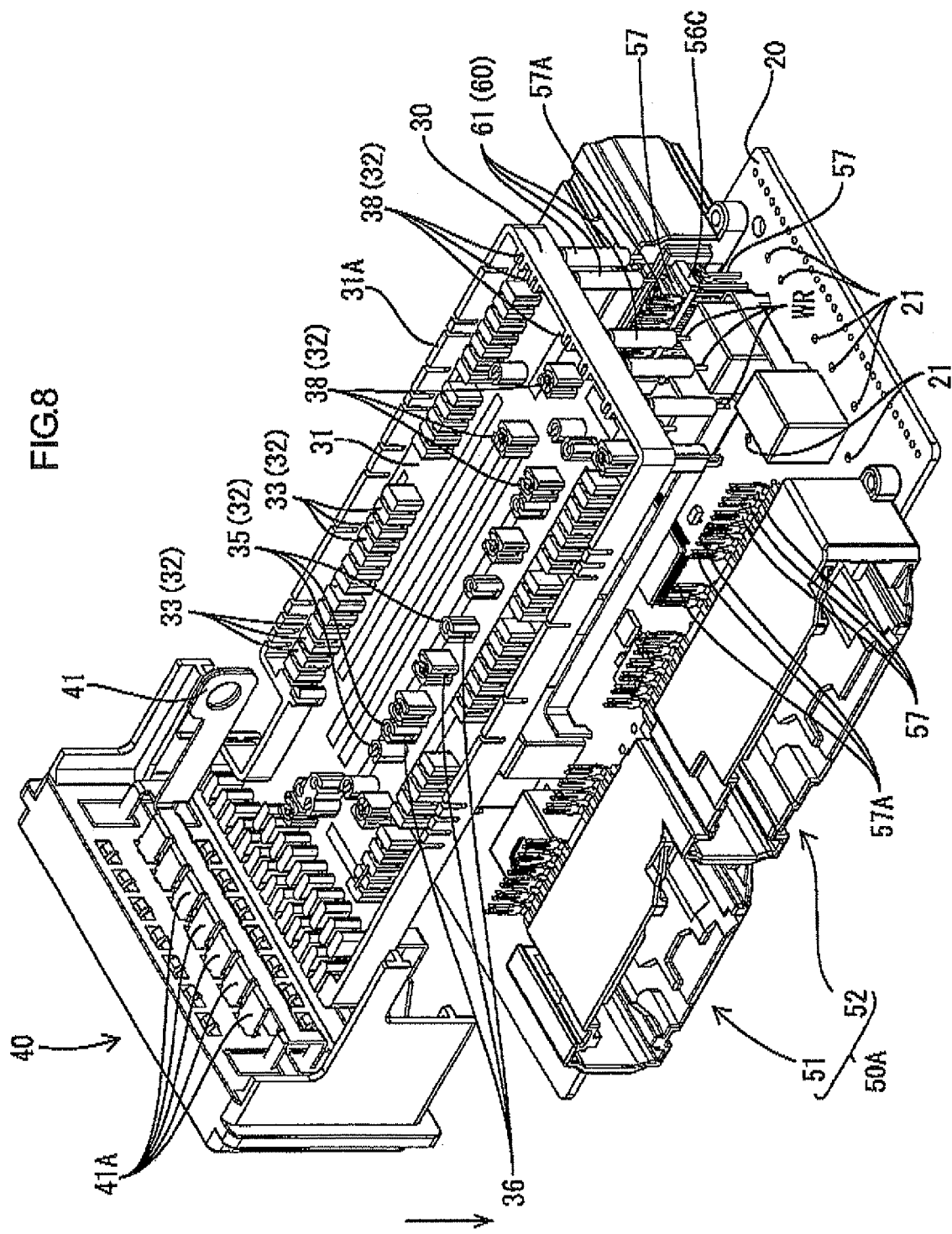
FIG. 8 is a perspective view showing a state before a wire routing plate is attached to a circuit board.
Figure 9:
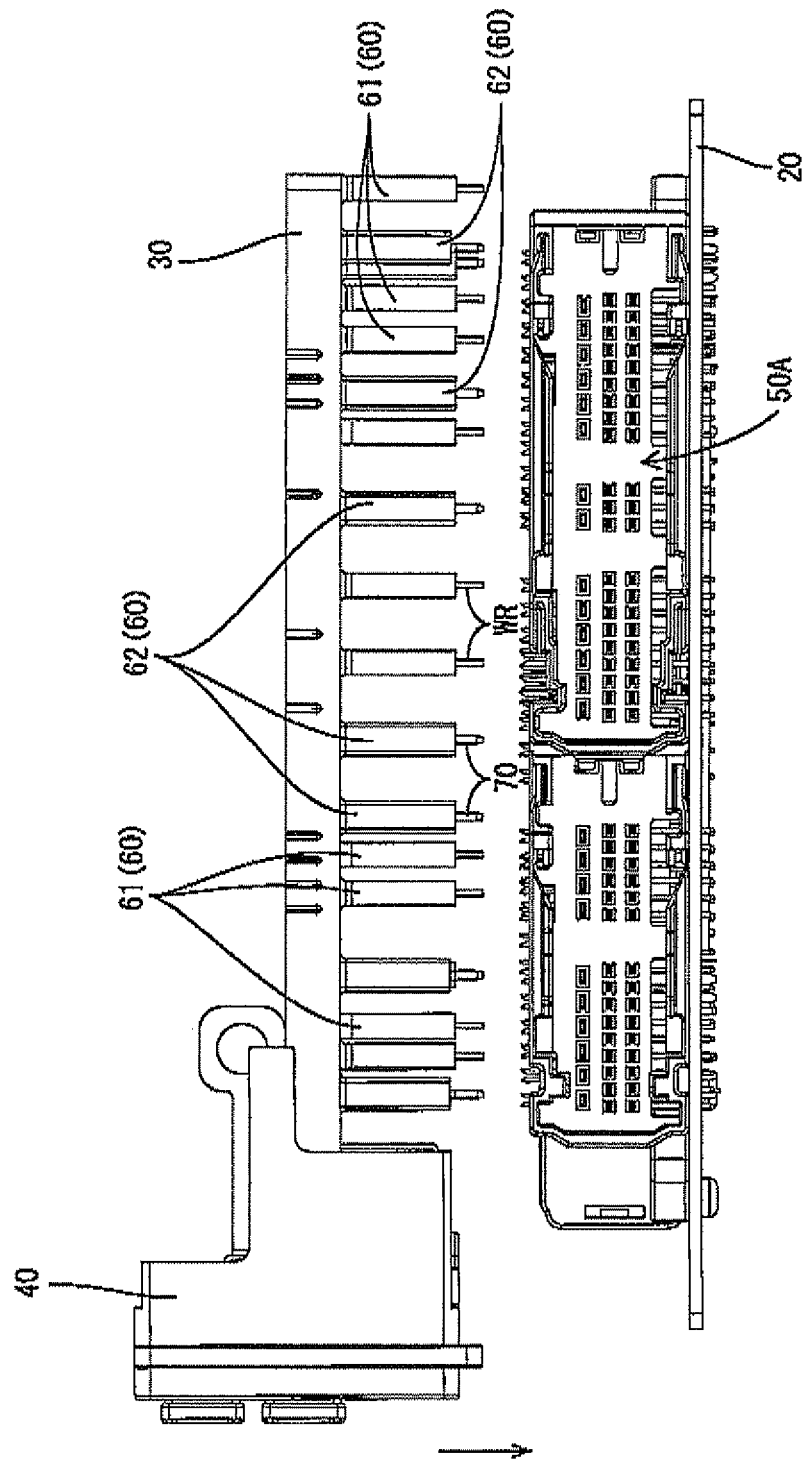
FIG. 9 is a front view of FIG. 8.
Figure 10:
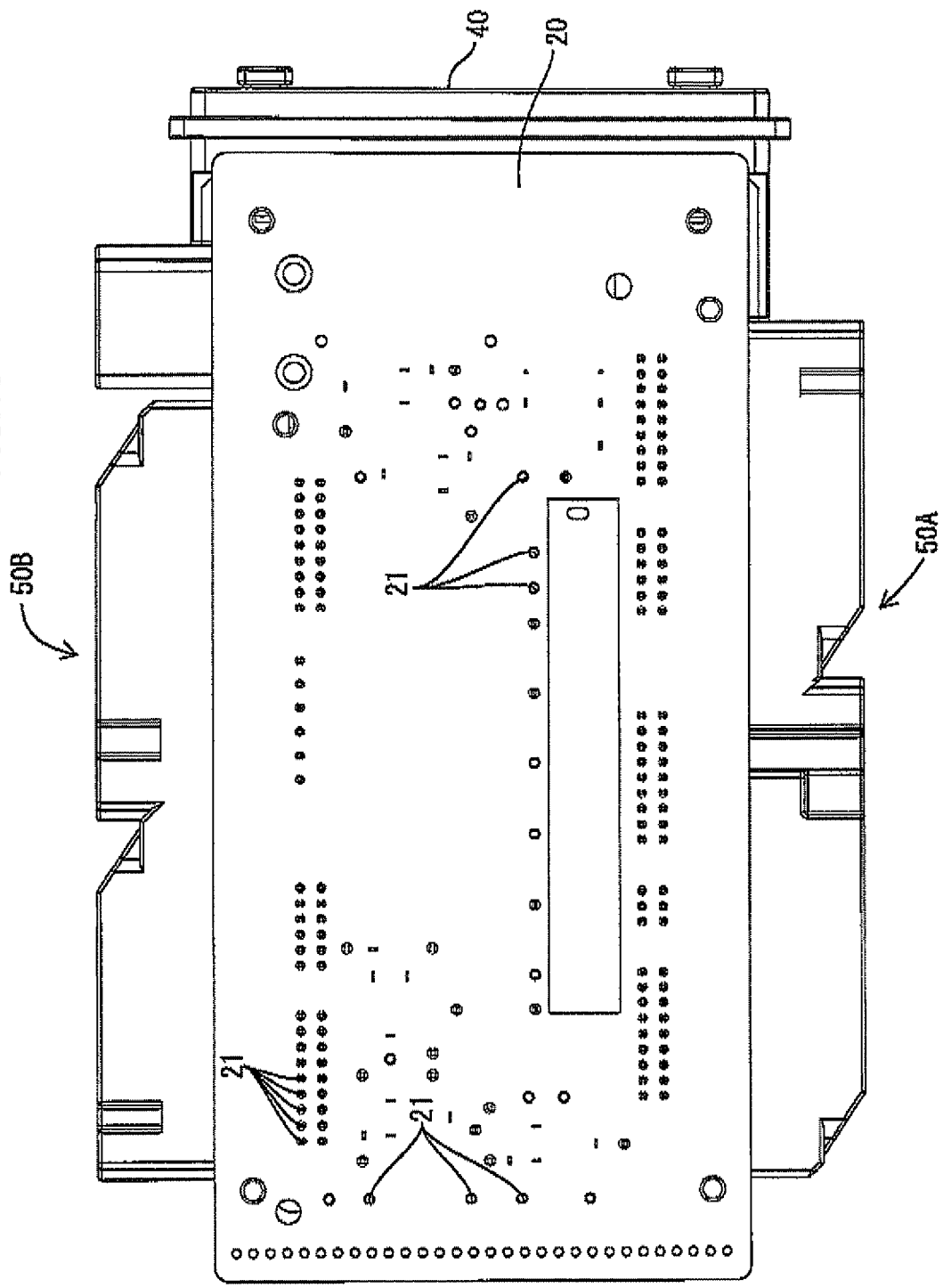
FIG. 10 is a bottom view of FIG. 8.
Figure 11:
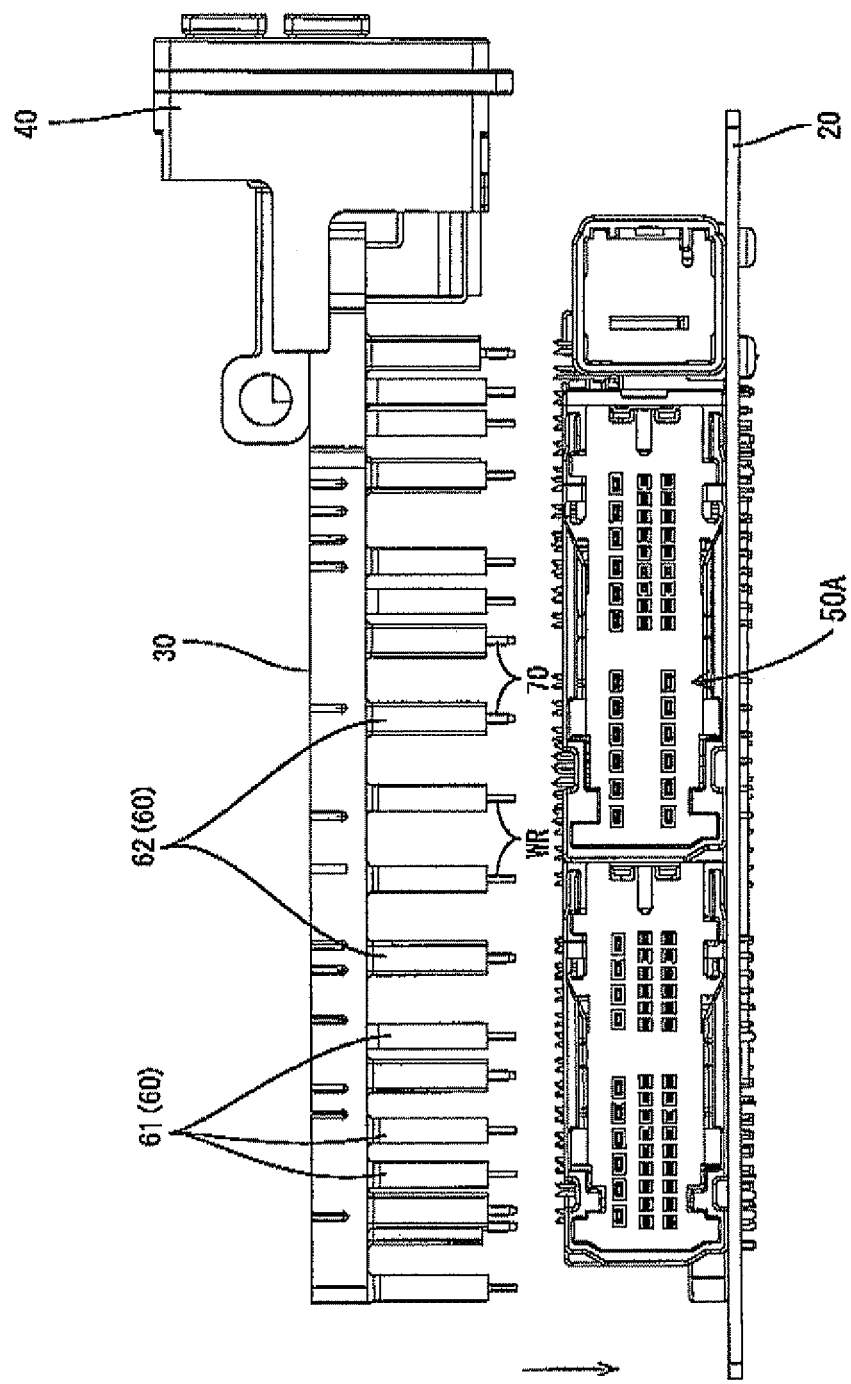
FIG. 11 is a rear view of FIG. 8.
Figure 12:
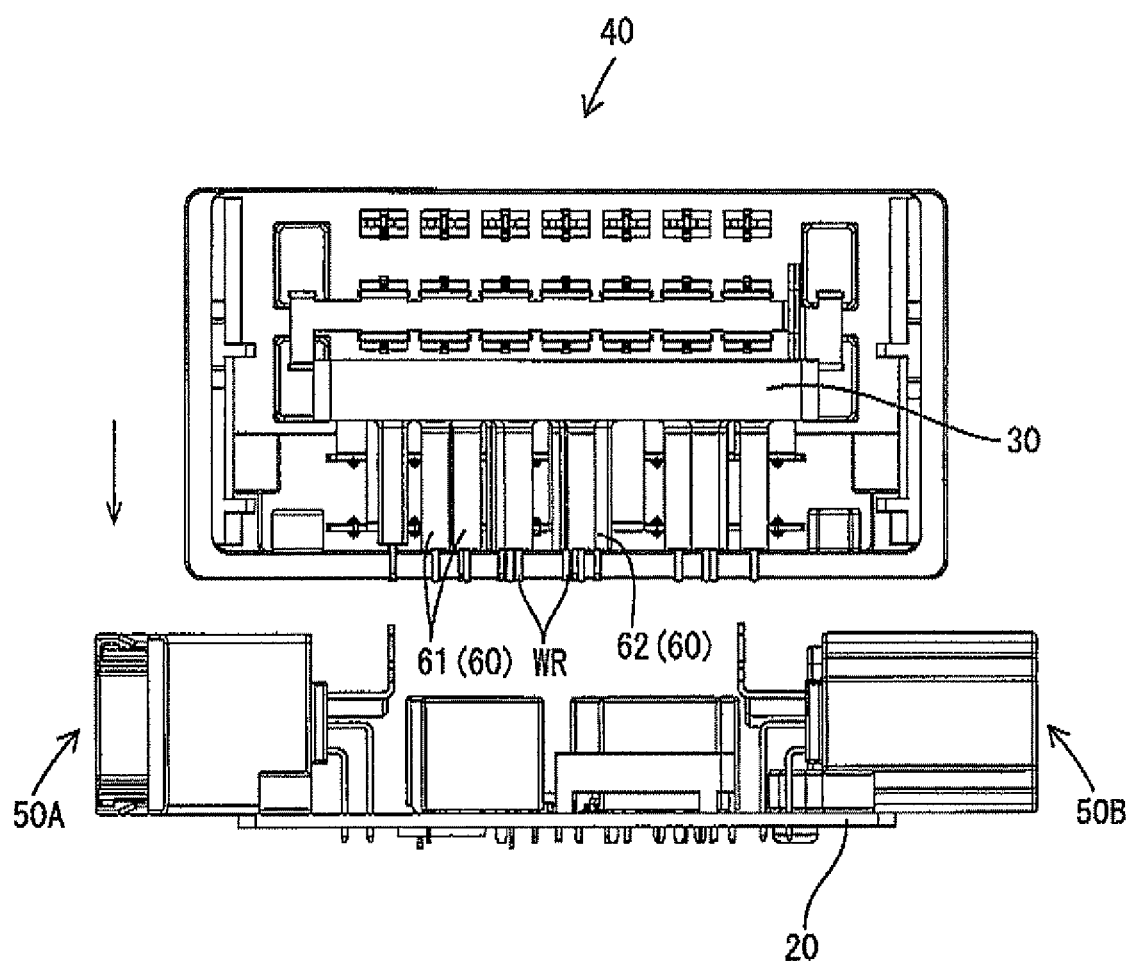
FIG. 12 is a side view of FIG. 8.

The circuit board 20 is rectangular in shape and has printed-circuit conduction paths formed thereon. As shown in FIG. 8, the circuit board 20 has a through-hole 21 formed therethrough vertically, which through-hole 21 is electrically connected to the conduction path on the circuit board 20.

The fuse block 40 is attached to a side surface of the wire routing plate 30 and has, inside its cover, a lateral arrangement of terminal portions in vertical three stages, which terminal portions are each connected to each fuse. The middle stage of terminal portions 41A are integrally structured on the rear (inner) side and bent at its arrangement-directional end portion, which portion provides a connection terminal portion 41 extended toward the rear (inner) side. A tip end portion of the connection terminal portion 41 has a circular connection hole formed through in it. The upper stage of terminal portions continues to a connector terminal 44 of each of connectors 42 and 43 (see FIG. 7) disposed continuing to connector blocks 50A and 50B.

The connector block 50A is attached to a front end portion of the circuit board 20 and includes connector portions 51 and 52 disposed side by side at the front end portion of the circuit board 20 as shown in FIG. 8. The connector block 50B includes three connector portions 53, 54, and 55 disposed side by side at a rear end portion of the circuit board 20 as shown in FIG. 1. The connector portions 51 to 55 are each configured by a connector housing 56 and a connector terminal 57.

The connector housing 56 includes a hood-shaped hood portion 56A and an inner wall portion 56B which blocks up an inner end portion of the hood portion 56A, which inner wall portion 56B is pierced by the connector terminal 57 such that the tip end portion of the connector terminal 57 projects into the hood portion 56A.

The connector portions 51 to 54 out of those 51 to 55 each have the three vertical stages of connector terminals 57 arranged horizontally side by side. As shown in FIG. 8, the upper-stage connector terminal 57 is bent upward at a right angle on the rear side (inner side) of the inner wall portion 56B such that its tip end portion (upper end portion) provides a press-contact terminal having a press-contact blade 57A. The press-contact blade 57A, which has a two-forked shape, cuts off the insulation sheath portion of the wire W after it is passed through the fork of the press-contact blade 57A and then comes in contact with the core wire in the wire W to be electrically connected to the core wire.

The connector terminals 57 in the middle and lower stages are each bent downward at a right angle on the rear (inner) side of the inner wall portion 56B such that the lower end portions are inserted into the through-holes 21 in the circuit board 20 and connected to the conduction paths on the circuit board 20.

From the inner wall portion 56B, a partitioning wall 56C separating the upper-stage connector terminals 57 and the middle-stage connector terminals 57 from each other projects toward the rear (inner) side.

The connector terminal 57 in the connector portion 55 serves as a power source terminal shaped like a flat plate.

The wire routing plate 30 is made of synthetic resin (for example, PBT) and has a flat-plate shaped flat plate portion 31 on which the wire W is disposed, a wire holding convex portion 32 (one example of "wire holding portion" described in Claims) projecting to the upper surface of the flat plate portion 31, and a positioning portion 60 which positions the tip end portions of a relaying wire WR and a relay terminal 70 which are extended to the back surface side of the flat plate portion 31. The flat plate portion 31 is rectangular in shape and surrounded by a surrounding wall 31A standing at its edge portion. The wire routing plate 30 is configured to be assembled to the circuit board 20 in the direction of an arrow in FIGS. 8, 9, 11, and 12.

The wire holding convex portion 32 includes a press-contacting holding portion 33 to which the wire W is held in condition where it is press-contacted, an insertion holding portion 35 which holds the wire W guiding to the back surface side, and a relay holding portion 38 which holds the relay terminal 70 (one example of "relay connection portion" described in Claims) relaying to the conduction path on the circuit board 20.

The press-contacting holding portion 33 includes multiple standing walls disposed side by side along the surrounding wall 31A and a midsection of each of the facing surfaces of the neighboring standing walls has a press-contacting concave portion in which the press-contact blade 57A of the connector terminal 57 is fit in and sandwiched. The press-contacting concave portion is formed into a groove shape in each of both surfaces of the press-contacting holding portion 33 over a range from a base end portion of the press-contacting holding portion 33 at the height of the upper surface of the flat plate portion 31 to an upper end of the press-contacting holding portion 33.

Between the mutually facing press-contacting holding portions 33 and 33 of the flat plate portion 31, an insertion hole is formed through the flat plate portion 31 to insert the connector terminal 57 therethrough.

Figure 17:
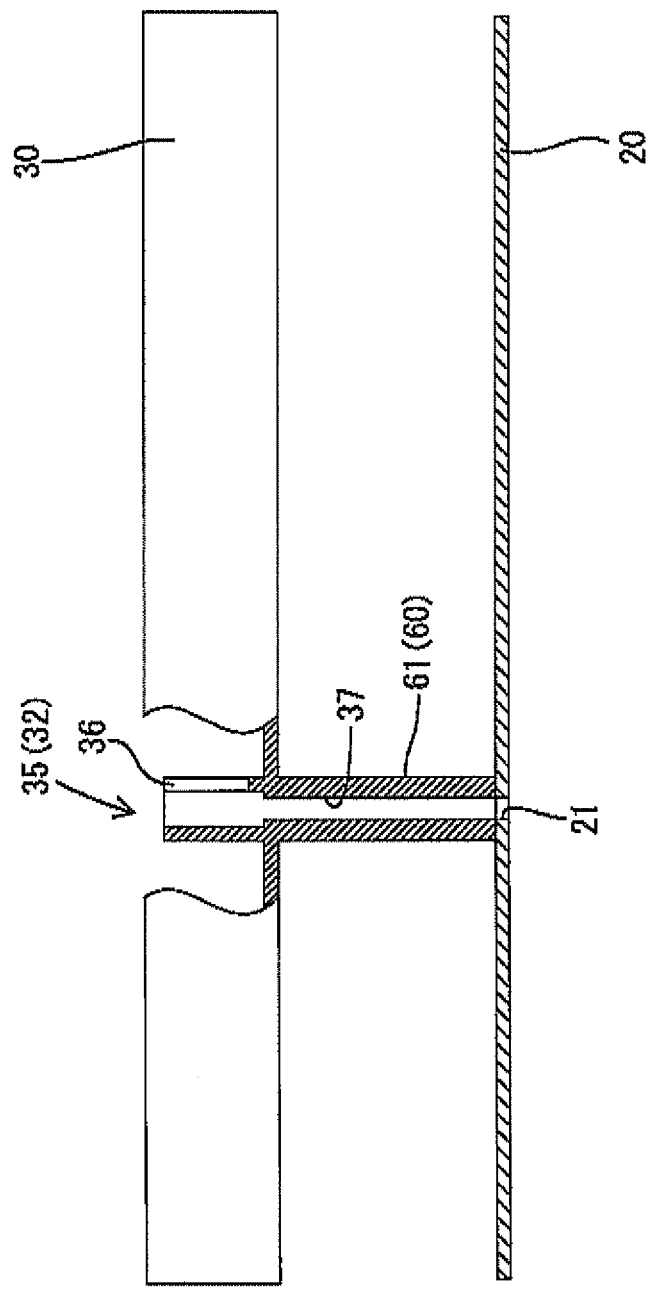
FIG. 17 is an illustrative view outlining an aspect in which the tip end portion of the wire positioning portion has abutted against the circuit board.

The insertion holding portion 35 is tubular in shape and, as shown in FIG. 17, has a wire let-in portion 36 which is notched large enough to let the wire W pass through axially (cut to have a C-shaped cross section).

At the center of the insertion holding portion 35 of the flat plate portion 31, a wire insertion hole 37 is formed through the flat plate portion 31 to communicate with the positioning portion 60. The wire W disposed on the flat plate portion 31 passes through the wire let-in portion 36 and is inserted through the wire insertion hole 37.

Figure 14:
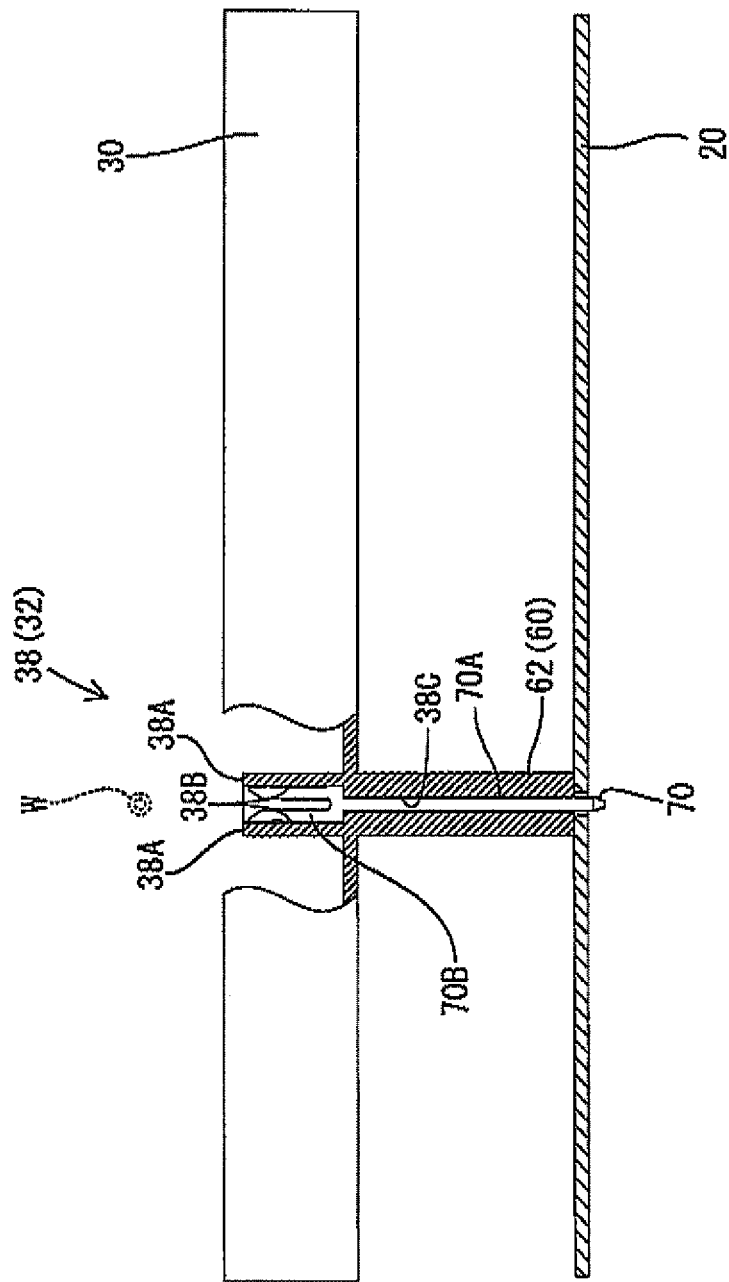
FIG. 14 is an illustrative view outlining an aspect in which the tip end portion of the terminal positioning portion has abutted against the circuit board.

The relay holding portion 38 is configured to hold the wire W which is press-contacted to the relay terminal 70 and, as shown in FIG. 14, has a pair of standing walls 38A and 38A respectively having press-contacting concaves 38B and 38B at their midsections in each of which a press-contact blade 70B is fit in and sandwiched. The press-contacting concave portion 38B is formed into a groove shape over a range from the base end portion of the standing wall 38A at the height of the upper surface of the flat plate portion 31 to the upper end of the standing wall 38A.

Between the mutually facing standing walls 38A and 38A of the flat plate portion 31, an insertion hole 38C is formed through the flat plate portion 31 passing through the positioning portion 60 to insert the relay terminal 70 therethrough.

The relay terminal 70 is a press-contact terminal which has, at its one end, a rod-shaped insertion terminal portion 70A to be inserted into the through-hole 21 in the circuit board 20 and, at the other end thereof, a press-contact blade 70B to be press-contacted to the wire W.

The press-contact blade 70B, which has a two-forked shape, cuts off the insulation sheath portion of the wire W after it is passed through the fork of the press-contact blade 70B and then comes in contact with the core wire in the wire W to be electrically connected to the core wire.

The positioning portion 60 is shaped like a cylinder having the insertion hole 37 (38C) therein and includes a wire positioning portion 61 positioning the wire W and a terminal positioning portion 62 positioning the relay terminal 70 which roughly projects downward at a right angle on the back surface of the flat plate portion 31 at a position corresponding to the insertion holding portion 35 and the relay holding portion 38 (i.e. positions corresponding to the through-hole 21).

Figure 18:
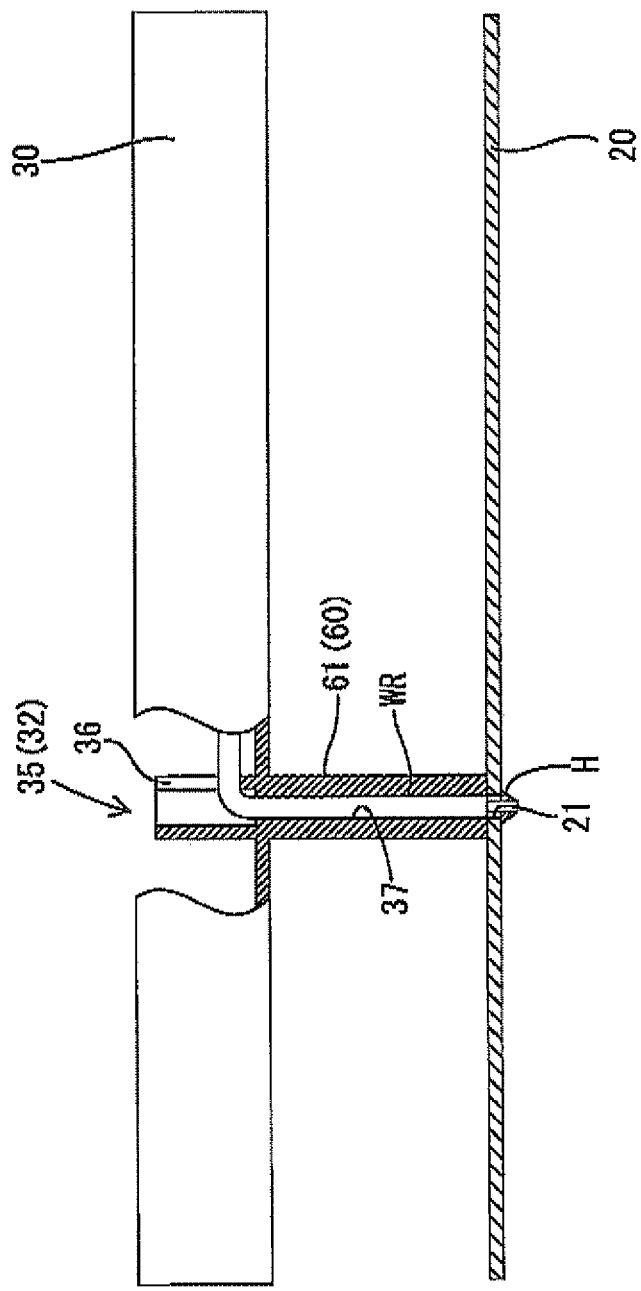
FIG. 18 is an illustrative view showing a state in which a relay wire is inserted to the wire positioning portion.

As shown in FIG. 18, the wire positioning portion 61 positions the relaying wire WR (one example of "relay connection portion" described in Claims) of the wires W that is guided via the insertion holding portion 35 to the back surface side of the wire routing plate 30 and inserted through the insertion hole 37 such that the core wire at the tip end portion exposed by removing the insulation sheath of the relaying wire WR projects from the end portion of the wire positioning portion 61. The projecting core wire is guided into the through-hole 21 and soldered to thereby be connected electrically to the conduction path on the circuit board 20.

The terminal positioning portion 62 is configured to position the relay terminal 70, and the relay terminal 70 is inserted through the insertion hole 38C such that its tip end portion projects from the tip end of the terminal positioning portion 62 as shown in FIG. 14. The projecting tip end portion is led into the through-hole 21 and soldered to thereby be connected electrically to the conduction path on the circuit board 20.

The relaying wire WR and the relay terminal 70 are inserted through the insertion hole 37 (38C) almost with no gap, such that the tip end portions of the relaying wire WR and the relay terminal 70 are positioned without misalignment (axial misalignment) with respect to a position toward the center of the through-hole 21.

The length of the positioning portion 60 is set to a size that covers the entireties of the respective portions of the relaying wire WR and the relay terminal 70 that come between the wire routing plate 30 and the circuit board 20. The thickness of the positioning portion 60 is set to a size that can keep alignment accuracy (1.5 mm in the present embodiment).

The wire routing plate 30 is shaped through molding by integrally shaping the flat plate portion 31, the wire holding convex portion 32, and the positioning portion 60 by pouring resin into a metal mold. Although the relay terminal 70 is configured to be press-fitted into the insertion hole 38C in the shaped wire routing plate 30, insert molding may be used to insert the relay terminal 70 into a metal mold beforehand and then pour and cure the resin in it.

Next, a description will be given of a method of assembling the circuit structure 10. The connector blocks 50 and 60 are attached to the circuit board 20 and the fuse block 40 is attached to the wire routing plate 30.

Figure 13:
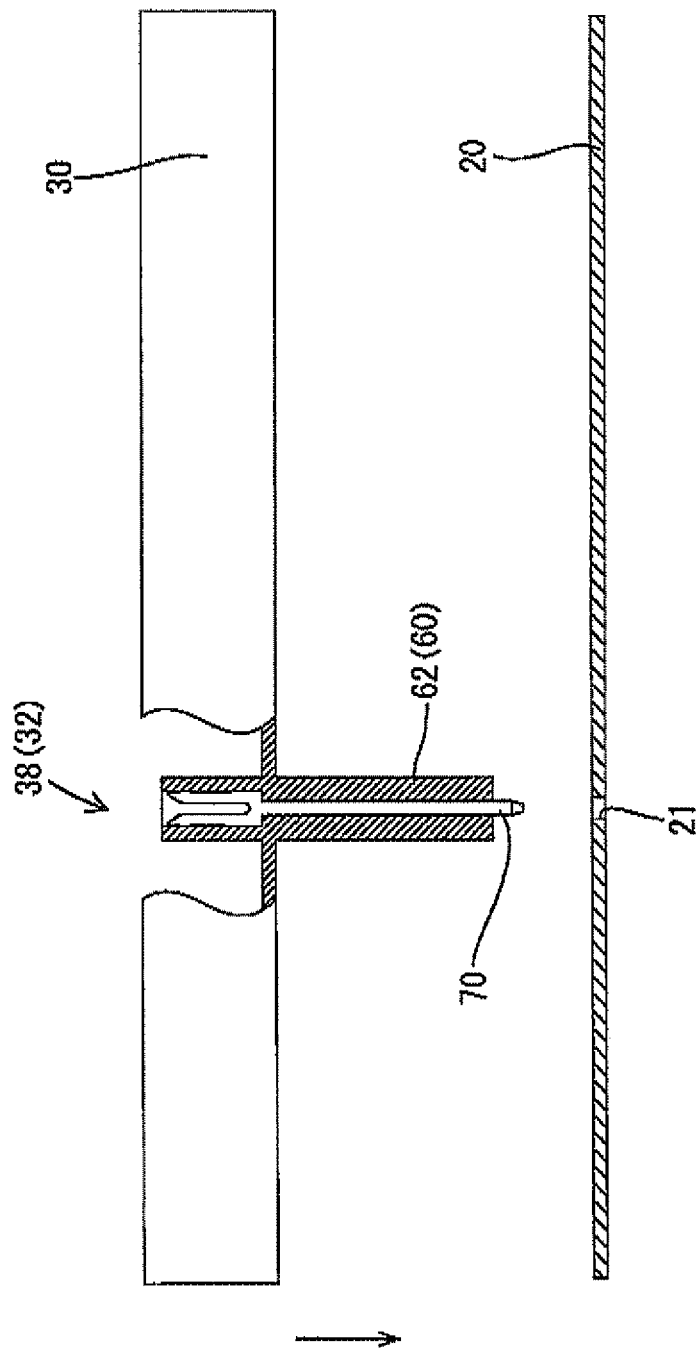
FIG. 13 is an illustrative view outlining how a tip end portion of a terminal positioning portion abuts against the circuit board.
Figure 16:
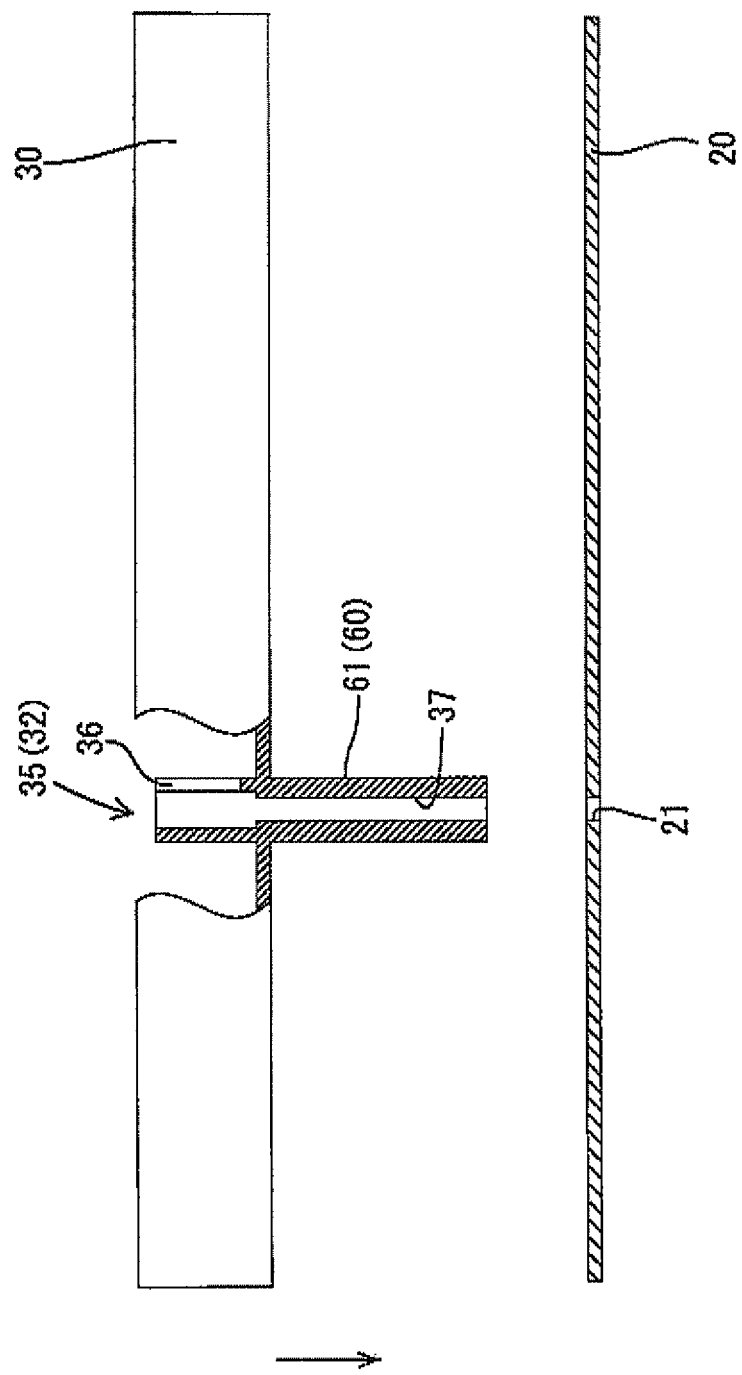
FIG. 16 is an illustrative view outlining how a tip end portion of a wire positioning portion abuts against the circuit board.

Then, as shown in FIGS. 13 and 16, the tip end portions of the relay terminal 70 and the relaying wire WR are brought near the board 20 in the direction of the arrow in alignment with the positions of the respective through-holes 21 in the circuit board 20 in condition where the circuit board 20 and the wire routing plate 30 face each other. At this time, each of the relay terminals 70 is already positioned by the terminal positioning portion 62 to keep high alignment accuracy, such that the tip end portion of each relay terminal 70 is inserted into each of the corresponding through-holes 21 (FIG. 14) and the tip end of the wire positioning portion 61 abuts against the surface of the circuit board 20 (FIG. 17. Accordingly, the circuit board 20 and the wire routing plate 30 are disposed to normal positions face-to-face at an interval of the length of the positioning portion 60 (state in FIG. 1).

Then, the wire W is press-contacted to the relay terminal 70 on the wire routing plate 30 and the tip end portion of the wire W is inserted from the insertion holding portion 35 into the insertion hole 37 to provide it as the relaying wire WR. At this time, the wire W passes through the insertion hole 37 in the wire positioning portion 61 disposed at a position continuing to the through-hole 21, such that the core wire exposed at the tip end portion of each relaying wire WR is accurately inserted into each of the corresponding through-holes 21.

Figure 15:
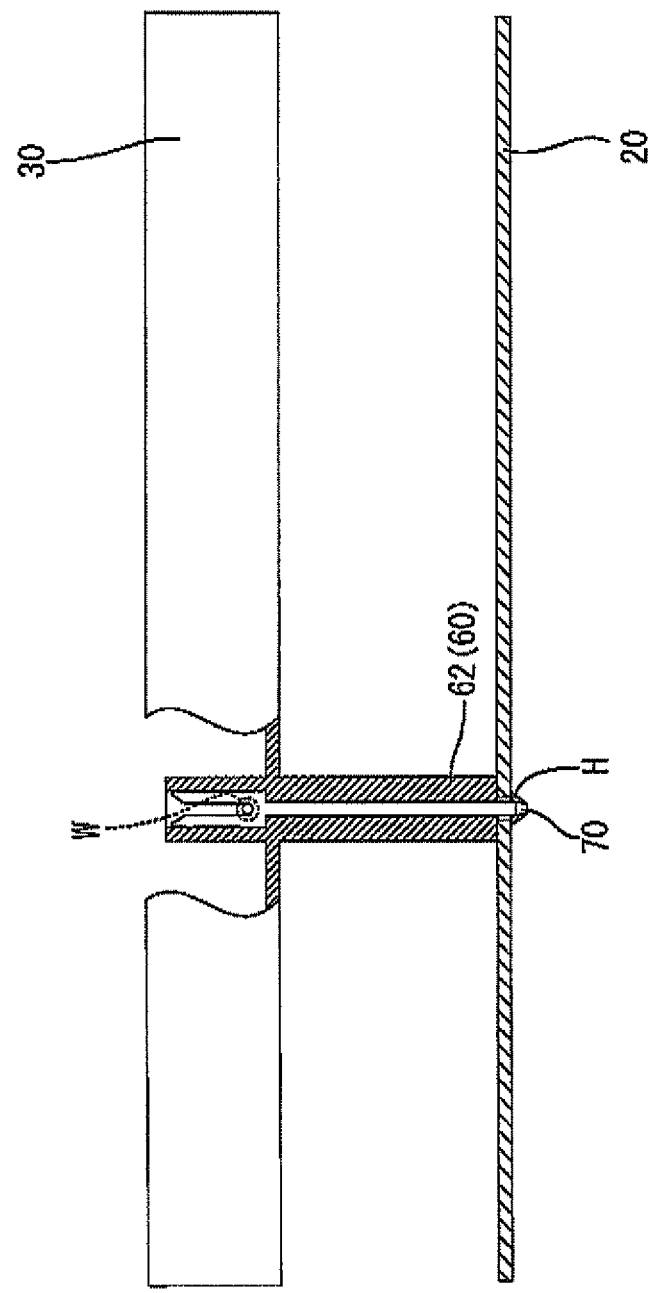
FIG. 15 is an illustrative view showing a state in which a wire is press-contacted to a relay terminal.

Next, flow soldering is performed to dip the lower surface side of the circuit board 20 into the surface layer of solder melted in a solder bath beforehand, thereby connecting the wire W via a solder H and the through-hole 21 to the conduction path on the circuit board 20 (FIGS. 15 and 18).

It completes assembling of the circuit structure 10. By housing the circuit structure 10, an electric junction box is completed.

Rather than routing the wire W after the wire routing plate 30 is assembled, the wire W may be routed onto the wire routing plate 30 (the wire W may be press-welded to the relay terminal 70 and the relaying wire WR may be inserted to the positioning portion 60) beforehand, to then dispose the wire routing plate 30 and the circuit board 20 face-to-face.

According to the present embodiment, the following effects are obtained.

(1) The relay terminal 70 (relay connection portion) is configured to interconnect the conduction path on the wire routing plate 30 (wire routing member) and the conduction path on the circuit board 20, to eliminate the need to use a bus bar bent for interconnection of the conduction paths, thereby enabling miniaturizing the circuit structure 10 and the electric junction box.

In this case, when attaching the wire routing plate 30 (wire routing member) to the circuit board 20, alignment accuracy may possibly be insufficient in the process to insert the tip end portion of the relay terminal 70 (relay connection portion) into the through-hole 21, thereby leading to poor insertion. However, according to the present embodiment, the positioning portion 60 is included to position the tip end of the relay terminal 70, thereby enabling insertion of the tip end portion of the relay terminal 70 into the through-hole 21 with improved alignment accuracy. Therefore, the workability can be improved in attachment of the wire routing plate 30 (wire routing member) to the circuit board 20.

(2) The relay terminal 70 is a press-contact terminal that has, at its one end, the insertion terminal portion 70A to be inserted into the through-hole 21 in the circuit board 20 and at the other end thereof, the press-contact blade 57A to be press-contacted to the wire W, thereby achieving a simplified structure of the relay connection portion.

(3) The need to prepare a separate member for the relay connection portion is eliminated by using the tip end portion of the wire W held on the wire routing plate 30 as the relaying wire WR (relay connection portion).

(4) The positioning portion 60 is shaped by integrally shaping it with the wire routing plate 30, thereby enabling easily shaping the positioning portion 60.

(5) The positioning portion 60 is shaped like a tube through which the relay terminal 70 is inserted, thereby enabling positioning of the relay terminal 70 and the relaying wire WR securely.

Second Embodiment

A description will be given of a second embodiment with reference to FIGS. 19 to 21. In the second embodiment, a notched portion 81 is provided at the tip end portion of a positioning portion 80 such that the interior can be recognized visually. The other structures are the same as those of the first embodiment; therefore, identical reference numerals are given to the identical components, and repetitive description on the identical components will be omitted.

Figure 19:
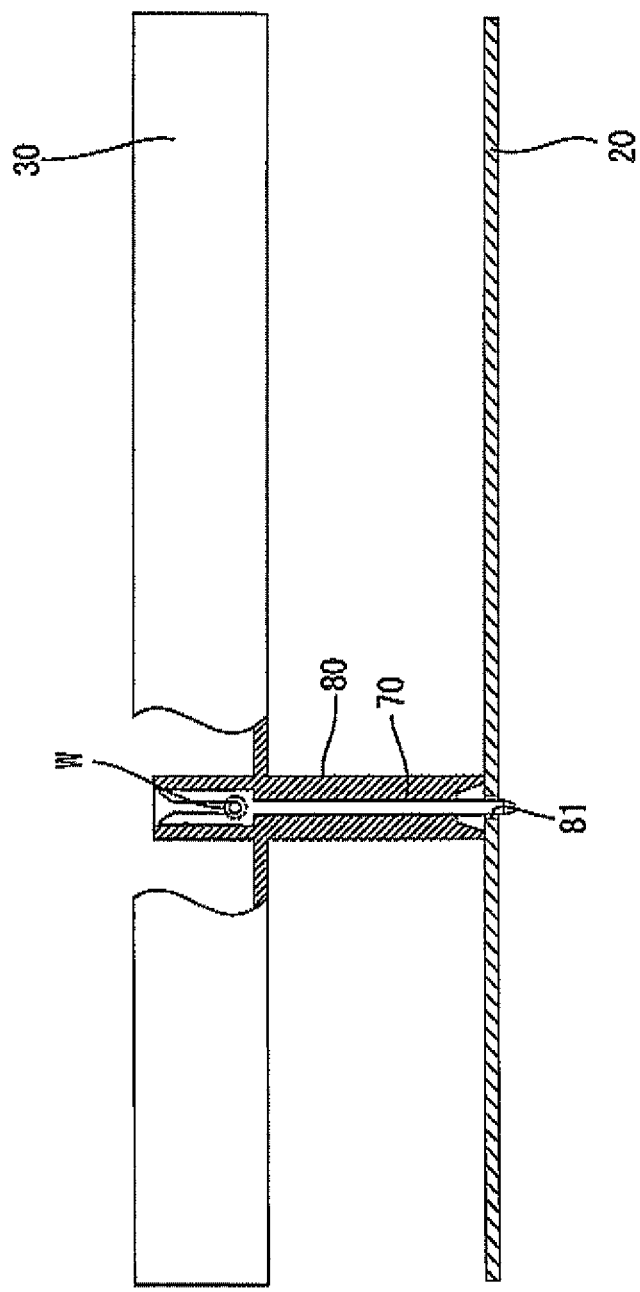
FIG. 19 is an illustrative view outlining the terminal positioning portion having a notched portion according to a second embodiment.
Figure 20:
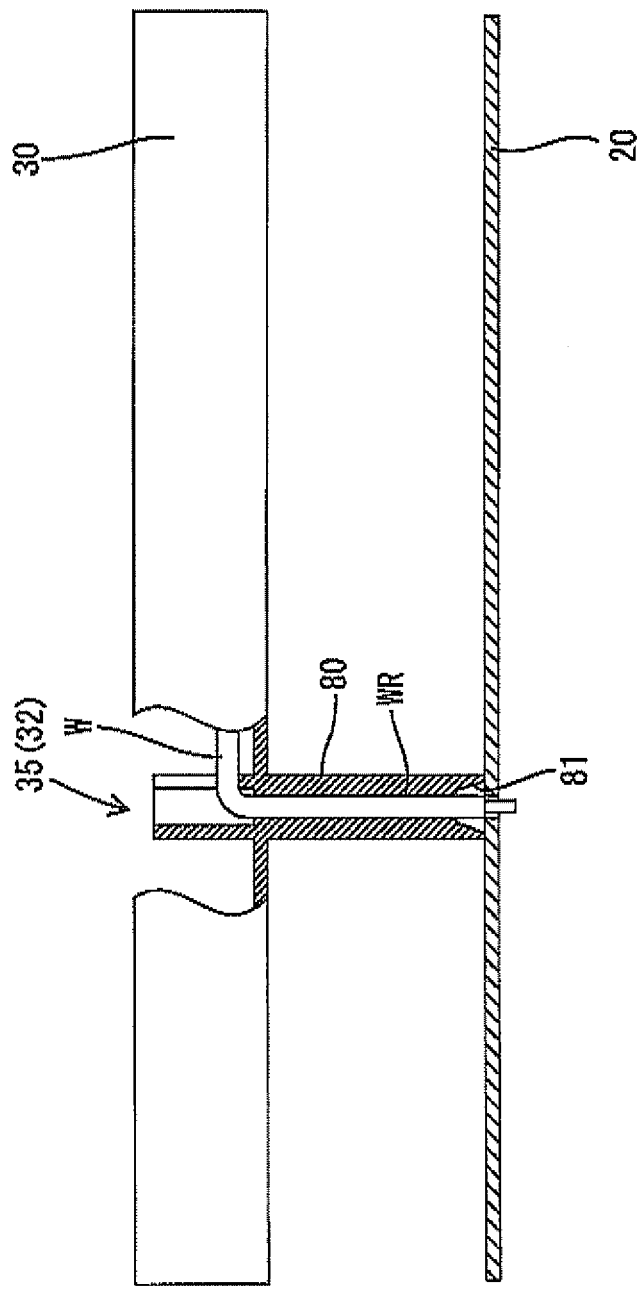
FIG. 20 is a an illustrative view outlining the wire positioning portion having a notched portion.

As shown in FIGS. 19 and 20, at the top end portion of the positioning portion 80, the notched portion 81 is formed to enable visually recognizing the interior of the inner insertion hole 37 (38C) laterally by communicating it to the insertion hole 37 (38C).

Figure 21:
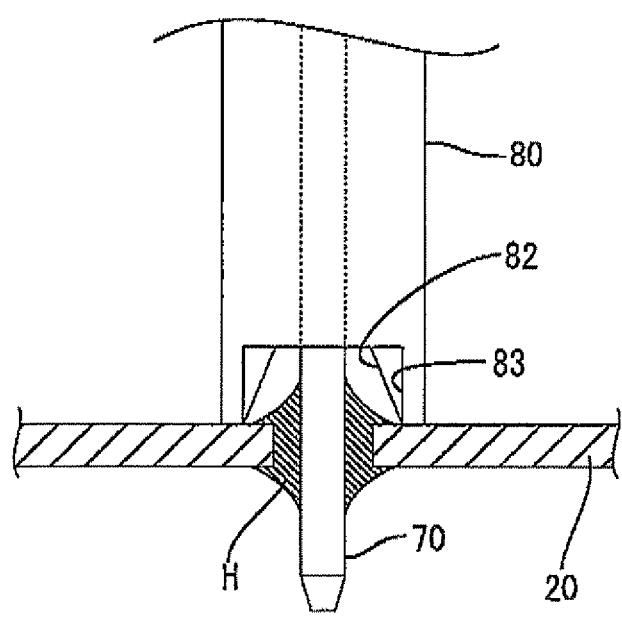
FIG. 21 is an illustrative view showing the notched portion soldered.

As shown in FIG. 21, the notched portion 81 has an diameter-expanded portion 82 notched into a trapezoidal shape which expands more as it gets closer to the tip end side of an axial centerline of a cylinder shape and an outer surface notched portion 83 which is notched in a rectangle communicating with the diameter-expanded portion 82 provided on the outer surface side.

On the circumferential surface, the notched portion 81 is formed in a direction (at an angle) such that the interior can be visually recognized laterally (through a gap between a circuit board 20 and a wire routing plate 30) along the circular outer circumference of the positioning portion 80.

The length of the positioning portion 80 to the upper end of the notched portion 81 (the length of a portion not having the notched portion 81) is set to the same as that of the positioning portion 80 of the first embodiment, thereby keeping up alignment accuracy even with the notched portion 81.

In the case of the positioning portion 80 whose tip end portion cannot be visually recognized from the outside because of its positional relationship with the other components in a circuit structure, the notched portion 81 may not be formed.

In this way the tip end portion of the positioning portion 80 has the notched portion 81 to enable visually recognizing its inside. Therefore, by visually recognizing the inside (the solder H in) through the notched portion 81, it is possible to check whether a relay terminal 70 inserted into the through-hole 21 is soldered properly.

Third Embodiment

A description will be given of a third embodiment with reference to FIG. 22. In contrast to the above embodiments in which the wire W is press-contacted to the relay terminal 70 after attaching the relay terminal 70 to the wire routing plate 30, in the third embodiment, as shown in FIG. 22, first the tip end of a positioning portion 60 is permitted to abut against the surface of a circuit board 20 to then dispose the circuit board 20 and the wire routing plate 30 face-to-face at the normal position. Then, in this state, the circuit structure is assembled by inserting (or press-fitting) the relay terminal 70 to which the wire W is press-contacted into an insertion hole 37 (38C) in the positioning portion 60 in the direction of an arrow in FIG. 22.

Other Embodiments

The present invention is not limited to the embodiments described above with reference to the drawings, and may cover, for example, the following embodiments in its technological scope.

(1) Although the positioning portion 60 (80) is shaped like a tube, the present invention is not limited to it as far as it can position the wire W and a relay connection portion such as the relay terminal 70. For example, it may be shaped like a rod that extends along the relay connection portion. Further, the positioning portion 60 (80) may not position the entireties of the wire W and the relay terminal 70 between the circuit board 20 and the wire routing plate 30 but may position at least the tip end portions of the wire W and the relay terminal 70 without positioning the base end sides of the relaying wire WR and the relay terminal 70 by separating them (providing a gap) from the positioning portion.

(2) Although the wire W and the relay terminal 70 are connected to each other by press-contacting, the present invention is not limited to it; they may be interconnected by any other method of, for example, soldering or crimping.

(3) Although the relay terminal portion includes both of the relaying wire WR and the relay terminal 70, only either one of the relaying wire WR and the relay terminal 70 may be used to interconnect the conduction paths. Further, correspondingly, as for the positioning portion 60 (80) also, only either one of the wire positioning portion 61 and the terminal positioning portion 62 may be used.

The present embodiment includes a circuit board having a conduction path and a through-hole continuing to the conduction path, a wire routing member that has a wire holding portion holding a wire configured to form a predetermined conduction path and that is disposed to face the circuit board, a relay connection portion having its one end inserted through the through-hole in the circuit board to thereby connect the conduction path of the wire routing member to the conduction path on the circuit board, and a positioning portion that is provided on the wire routing member to thereby position a tip of the relay connection portion (means 1).

According to the structure of the means 1, the relay connection portion interconnects the conduction path on the wire routing member and that on the circuit board, to eliminate the need to use a bus bar bent for interconnection of the conduction paths, thereby enabling miniaturizing the circuit structure and the electric junction box.

In this case, when attaching the wire routing member to the circuit board, alignment accuracy may possibly be insufficient in a process to insert the tip end portion of the relay connection portion into the through-hole, thereby leading to poor insertion. However, according to the present structure, the positioning portion is included to position the tip end of the relay connection portion, thereby enabling insertion of the tip end portion of the relay connection portion into the through-hole with improved alignment accuracy. Accordingly, it is possible to improve workability in attachment of the wire routing member to the circuit board.

In addition to the structure of the means 1, the relay connection portion may be a press-contact terminal having, at its one end, an insertion terminal portion to be inserted into the through-hole in the circuit board and, at the other end thereof, a press-contact blade to be press-contacted to the wire (means 2).

The structure of the means 2 can achieve a simplified structure of the relay connection portion.

In addition to the structure of the means 1, the relay connection portion may be formed of the tip end portion of the wire held on the wire routing member (means 3).

According to the structure of the means 3, the tip end portion of the wire forms the relay connection portion, thereby eliminating the need to prepare a separate member as the relay connection portion.

In addition to any one of the means 1 through 3, a connector held by the circuit board and the wire routing member may be included further, in which some terminals of the connectors may be connected to the conduction path on the circuit board and some of the other terminals of the connectors may be connected to the wire held on the wire routing member (means 4).

In addition to the structure of any one of the means 1 through 4, the positioning portion may be formed integrally with the wire routing member (means 5).

According to the structure of the means 5, the positioning portion can be formed easily.

In addition to the structure of any one of means 1 through 5, the positioning portion may be shaped like a tube through which the relay connection portion is passed (means 6).

According to the structure of the means 6, positioning can be performed reliably.

In addition to the structure of any one of the means 1 through 6, the tip end portion of the positioning portion may have a notched portion which enables visually recognizing the inside (means 7).

According to the structure of the means 7, by visually recognizing the inside through the notched portion, it is possible to check whether the relay connection portion inserted into the through-hole is soldered properly.

An electric junction box may be provided which includes the circuit structure according to any one of the means 1 through 7 and a case which houses the circuit structure (means 8).

The invention claimed is:

1. A circuit structure comprising:
a circuit board having a conduction path and a through-hole continuing to the conduction path;
a wire routing member that has a wire holding portion holding a wire configured to form a predetermined conduction path, the wire routing member and the circuit board being disposed to face each other and being separated by a gap;
a relay connection portion having one end, the one end is inserted through the through-hole in the circuit board to thereby connect the conduction path of the wire routing member to the conduction path on the circuit board; and
a positioning portion that is provided on the wire routing member to thereby position a tip of the relay connection portion at the one end inserted through the through-hole.

2. The circuit structure according to claim 1, wherein the relay connection portion is a press-contact terminal having, at the one end, an insertion terminal portion to be inserted into the through-hole in the circuit board and, at the other end thereof, a press-contact blade to be press-contacted to the wire.

3. The circuit structure according to claim 1, wherein the relay connection portion is formed of a tip end portion of the wire held on the wire routing member.

4. The circuit structure according to claim 1, further comprising a connector held by the circuit board and the wire routing member, wherein
some terminals of the connectors are connected to the conduction path on the circuit board and some other of the terminals of the connectors are connected to the wire held on the wire routing member.

5. The circuit structure according to claim 1, wherein the positioning portion is formed integrally with the wire routing member.

6. The circuit structure according to claim 1, wherein the positioning portion is shaped like a tube through which the relay connection portion is passed.

7. The circuit structure according to claim 1, wherein the positioning portion defines a tip end portion that has a notched portion which enables visually recognizing an interior of the positioning portion.

8. An electric junction box comprising:
the circuit structure according to claim 1; and
a case which houses the circuit structure.

9. The circuit structure according to claim 6, wherein the interval is defined by an axial length of the positioning portion shaped like a tube.

10. The circuit structure according to claim 1, wherein the positioning portion is configured to support the relay connection portion along a majority of the gap separating the wire routing member and the circuit board.

11. The circuit structure according to claim 10, wherein the positioning portion is configured to support the relay connection portion along substantially the entire gap separating the wire routing member and the circuit board.

* * * * *